United States Patent [19]

Latanision

[11] 3,873,512
[45] Mar. 25, 1975

[54] MACHINING METHOD
[75] Inventor: Ronald M. Latanision, Columbia, Md.
[73] Assignee: Martin Marietta Corporation, New York, N.Y.
[22] Filed: Apr. 30, 1973
[21] Appl. No.: 355,724

[52] U.S. Cl..... 204/129.46, 204/129.25, 204/129.2, 51/281 R
[51] Int. Cl............................................. B23p 1/04
[58] Field of Search....... 204/129.2, 129.25, 129.46; 51/281 R

[56] References Cited
UNITED STATES PATENTS
| | | | |
|---|---|---|---|
| 416,873 | 12/1889 | Tilghman | 51/281 R |
| 1,017,671 | 2/1912 | Jenkins | 51/281 R |
| 2,826,540 | 3/1958 | Keeleric | 204/129.46 |
| 3,442,779 | 5/1969 | Hoey | 204/197 |

Primary Examiner—T. Tung
Attorney, Agent, or Firm—John A. Crowley, Jr.; James B. Eisel

[57] ABSTRACT

A method of machining a metallic workpiece with a worktool by passing an electrolyte in contact with the workpiece; immersing an auxiliary electrode in said electrolyte; providing a reference electrode; applying an electrical potential to the workpiece, in relation to the reference electrode, sufficient to control the mechanical and physical properties of the workpiece without significantly chemically depleting metal from the workpiece; and removing metal from the workpiece principally by the frictional movement of the worktool in direct contact with the workpiece.

16 Claims, 2 Drawing Figures

MACHINING METHOD

BACKGROUND OF THE INVENTION

With the ever-increasing use of high strength and high temperature alloys in recent years, various methods have been developed to machine these hard-to-cut materials as parts for modern machinery.

Traditional and well-known techniques for machining metals include subjecting the metal workpiece to the frictional movement of an abrading tool, or the like, to physically remove a portion of the metal from the workpiece. This technique is simply known as mechanically machining (MM) the metals.

Advances in the technology of machining metals have also been concerned with a method in which metal is removed from an electrically conductive workpiece in a liquid dielectric by means of electrically discharged sparks. This machining procedure has been called electrical discharge machining (EDM).

Electrochemical machining (ECM) of metals is one of the newest of the non-traditional metal machining techniques. While the application of electrolytic machining as a metal working tool is rather new, the basic principles are not. These techniques are generally founded on the Faradaic dissolution principle that if two conductive poles are placed in a conductive electrolyte bath and energized by a direct current, metal may be deplated from a positive pole and plated on to a negative pole. Such techniques are typified in U.S. Pat. Nos. 3,301,776, 3,324,021, and 3,332,864.

Among the particular types of electrochemical machining techniques that have grown in importance in recent years include electrochemical honing (ECH) and electrochemical grinding (ECG), as typified in U.S. Reissue Pat. No. 26,499, and Pat. No. 3,317,416, respectively. In such techniques the chemical plating capabilities of the system is combined with the accuracy capabilities of honing or grinding. That is to say, metal from the workpiece is still removed by deplating, but the surface of the workpiece is simultaneously abraded by grinding or honing to move the oxide film or coating from the surface of the workpiece to thereby expose fresh metal for subsequent dissolution. In these situations, the main objective is to utilize the highest possible electrode potential within the system because this achieves the highest dissolution rate to increase the speed of metal removal. In these situations, approximately 90–95% of metal removal occurs by dissolution whereas only about 5–10% of the metal is removed by actual frictional contact between the workpiece and the worktool.

While the prior art techniques have been generally successful in providing worthwhile process for machining metals, improving the surface finish of the metal workpiece as a result of the machining step and increasing the useful life of the worktool along with decreasing the cost of the electric energy need in the operation, are always sought.

It is an object of this invention to provide a process for the machining of metal workpieces with the use of a worktool that satisfies the above sought after improvements.

Other objects will be apparent to those skilled-in-the-art from an inspection of the description hereinafter set forth.

STATEMENT OF THE INVENTION

In accordance with certain of its aspects, the novel process of this invention for machining a metal workpiece with a worktool may comprise passing an electrolyte in contact with a workpiece; immersing an auxiliary electrode in said electrolyte; providing a reference electrode; applying an electrical potential to the workpiece, in relation to the reference electrode, sufficient to control the mechanical and physical properties of the workpiece without significantly chemically deplating metal from the workpiece; and removing metal from the workpiece principally by the friction movement of the worktool in direct contact with the workpiece.

DESCRIPTION OF THE INVENTION

This invention contemplates electromechanical machining of metal and metal alloys (EMM) whereby a large number of metals and alloys may be treated. Some metallic workpieces which may be machined by the principals of this invention include aluminum, copper, nickel, iron and titanium. Alloy compositions which may be likewise treated include compositions having the above components in major amounts along with cobalt and magnesium based alloys.

The machining of metallic workpieces may be accomplished by the use of a worktool which may typically be a grinder, drill bit, cutter, or the like, preferably a cutter. The worktool may be made of typically a ceramic, metal carbide, or tool steel material, preferably a carbide material.

In the practice of this invention an electrolyte may first be passed into contact with the workpiece. Preferably, the workpiece may be completely immersed in a bath of an electrolyte. Alternately, the workpiece may be partially immersed in the electrolyte as, for example, a continuous stream of the electrolyte may be projected against the workpiece so as to provide intimate contact between the workpiece and the electrolyte.

The electrolyte that may be used in the process of the invention may be of the general type which may be a liquid, non-metallic, electric conductor in which current is capable of being carried by the movement of ions therethrough. Further, the electrolyte should promote passivation (i.e., the formation of a protective oxide film over a certain range of potentials on the workpiece). Typical passivating electrolytes would include mineral acids such as sulfuric, boric, nitric and phosphoric acid and salts of these acids. A preferred electrolyte may be an aqueous 1N sodium sulfate solution.

An auxiliary electrode may be immersed in the electrolyte bath which contains the workpiece or may be immersed in the continuous stream of electrolyte that is projected against the workpiece. Typically, the auxiliary electrode may be made of platinum or carbon, preferably platinum.

A reference electrode may also be provided. Typically, this reference electrode may be immersed in the same electrolyte bath that may carry the auxiliary electrode or the reference electrode may itself be positioned external to the bath, being immersed in a separate electrolyte which may be confined in a separate container. The reference electrode may be separated from the bath in order to eliminate any possible contamination of the reference electrode. Further, such a separation of electrodes thereby may make it possible to utilize a different electrolyte for both the workpiece and auxiliary electrodes as opposed to the electrolyte in which the reference electrode may be immersed. If the reference electrode is arranged external to the electrolyte bath, a conductive bridge carrying a gelatinous material may be provided between the separated electrolytes. The bridge may conductively connect the electrolytes together. Preferably, the reference electrode may be a standard Calomel electrode (S. C. E.) and may measure electrical potentials by means of a Luggin bridge probe assembly. The electrolyte contained in the separate container for the reference electrode may be a common type of electrolyte and may typically include mineral acids, such as sulfuric, hydrochloric, boric, nitric and phosphoric acids and salts of these acids, say potassium chloride.

It may be contemplated by this invention to set up a circuitry system whereby the metallic workpiece may be made one of the electrodes in a three electrode system whereby the auxiliary and reference electrodes may be the other electrodes. The circuitry system may include electric wires connecting the workpiece, the auxiliary electrode and the reference electrode to a source of electrical potential, such as a conventional potentiostat. In such a system, it may be possible to apply an electrical potential to the working electrode (workpiece) relative to the reference electrode which causes a current to pass between the workpiece and the auxiliary electrode in the electrolyte confined in the bath. This is known as polarization.

The mechanical and physical properties of a metallic workpiece may be affected or controlled by the anodic or cathodic polarization to which it is subjected at low current densities by the electrical potential applied to the workpiece. The physical properties of a metal may include its coefficient of friction while the mechanical properties may include the hardness and strength of the metal. These latter two physical characteristics relate to work-hardening of the metal. The particular nature of the physical and mechanical properties of the metal may govern the removal of metal from a workpiece and, accordingly, by controlling the electrochemical behavior of metal, it is possible to materially influence the machinability of a metal workpiece. That is to say, the mechanical and physical properties of a metal workpiece may be controlled by applying an electrical potential to the workpiece (i.e., by electrochemical polarization). For example, the tensile strength and work-hardening capacity of metals may be significantly increased or decreased (up to 40%) if low current densities are applied to the metallic workpiece which is made an electrode in an electrolytic polarization cell. Further, the coefficient of friction can be changed by the application of varied low current densities to a workpiece-electrode.

The current density to which the workpieces are subjected may be substantially lower than those values which would involve substantial dissolution of the workpiece as a means of metal removal. The low current desities may, however, provide sufficient polarization to influence the mechanical and physical properties of the metal workpiece in order to tailor the workpiece to the machining operation that will best suit the objectives of the operator.

The optimum potential that may be applied to the workpiece may be determined from experience and may be based upon known engineering data that may be available to one skilled-in-the-art taking into consideration the composition of the workpiece, the type of electrolyte and the machining worktool that may be used in the system. Preferably, a calculator, or like device, may be used to compute the optimum potential that may be applied under a given situation. In the case of polycrystalline nickel, for example, operating an electrolytic cell at current densities of below approximately 10 mA/cm$^2$, say 1 mA/cm$^2$, at a potential in the range of about 800–1600 mV (SCE) may be sufficient to desirably affect the mechanical and physical properties of the workpiece for subsequent cutting without substantially removing metal by Faradaic dissolution.

It is to be understood that the workpiece may be either anodically or cathodically polarized and still influence the mechanical and physical properties of the metallic workpiece. While it is preferred to anodically polarize the workpiece, the cell may also be operated such that the workpiece may be made the cathode in which case the metal cathode serves only as a site for the discharge of hydrogen ions from the electrolyte, and, hence, may not be dissolved.

Metal may be removed from the workpiece by the frictional movement of the worktool in direct contact with the workpiece. Any well-known machining technique may be used to remove the metal. Such procedures typically include grinding, boring, drilling, shaping, milling, and the like. However, in accordance with this invention, the metal is removed principally by the frictional movement of the workpiece and a substantial amount of metal is not removed by electrolytic dissolution because the electrical potential applied to the workpiece and the resulting current density applied to the workpiece may be substantially lower than that necessary for substantial dissolution of metal to occur from the workpiece. In other words, no substantial dissolution of the metal from the workpiece may occur because the electrical potential applied to the workpiece is such that the workpiece may be passivated (covered with a thin protective film) or the workpiece may serve as a site for the evolution of various gases (oxygen and, perhaps, halogens at anodic potentials and hydrogen at cathodic potentials) both of which reduce the current available for dissolution.

The particular temperature within which the electrolyte may be maintained during the operation of the process defined herein may be varied depending upon the type of electrolyte used. For example, the temperature of a 1N Na$_2$SO$_4$ solution used in cutting nickel may be kept within the range of 20°–25°F., say 23°F. Additionally, the depth of the cut, the speed during which the cut is made and the rake angle for this process may depend upon the configuration of the finished product and the mechanical and physical parameters of the metal workpiece, as well as the cutting tool.

It is well recognized that a potential difference may be developed between a simple electrically conducting tool and a metal workpiece which is being machined because of the temperatures generated in the contact zones. If a complete electrical circuit were set up such that the tool and worktool were electrically connected in series, a thermoelectric current will flow through the circuit thereby inducing a thermoelectric emf to occur at the workpiece-worktool contact zone. This current would act to lessen the useful life of a worktool. The particular direction in which the current will move through such a circuit is dependent upon the electrical characteristic of the metal workpiece and the metal worktool. The particular direction of the current and its magnitude may be sensed by any common and well-known means, such as an ammeter. A modified form of this invention therefore contemplates providing a system whereby this thermoelectric current may be sensed to note its magnitude and direction. Then an equal and opposite electrical current may be applied by a separate electrical potential source through the circuit to cancel the effects of the thermoelectrically produced current. Stated in another way, an electrical potential may be applied to the worktool and the workpiece to compensate for this thermoelectric effect. In the modified form of the invention, a second electrical circuit, external to the electrolytes, may be added between the worktool and the workpiece along with a second source of electrical potential, such as a potentiometer. A first electrochemical current may thereby be passed between the workpiece and the auxiliary electrode through the electrolyte and a second current may be passed through the worktool and workpiece. This second current may act to compensate for or cancel the thermoelectric current which may arise due to the development of a thermoelectric emf at the workpiece-worktool contact zone.

The optimum electrical potential that may be applied across the workpiece and the worktool electrodes by the second source of electrical potential may be determined and computed from experience and may be based upon known engineering data that may be available to a man skilled-in-the-art taking into consideration the composition of the workpiece, and the type of machining worktool that may be used after the direction and magnitude of the current passing through the second circuit is sensed. Preferably, a calculator, or like device, may be used to compute the optimum potential that may be applied under a given condition. It may be preferable to operate the second circuit such that the imposed current developed between the workpiece and the worktool may be between 0 and 120 mA, say 80 mA. It is, of course, appreciated that when a non-conducting ceramic worktool is used, no thermoelectric emf may develop and, hence, no compensation is required to affect tool wear.

It is a feature of this invention to improve the efficiency of metal machining and thereby yield superior metal machining by improving the surface of the machined workpiece, by increasing the life of the worktool used in the operation, by lowering the ordinary electrical energy requirements for removing metal using electrochemical techniques and by utilizing electrochemical assistance and thermoelectric compensation in an additive manner to machine metallic workpieces. By practicing the method of this invention, approximately 95–100% of the metal removal occurs by the frictional movement of the worktool in direct contact with the workpiece whereas about 5% or less of the metal is removed by dissolution.

DESCRIPTION OF THE PREFERRED EMBODIMENT

Figure 1:
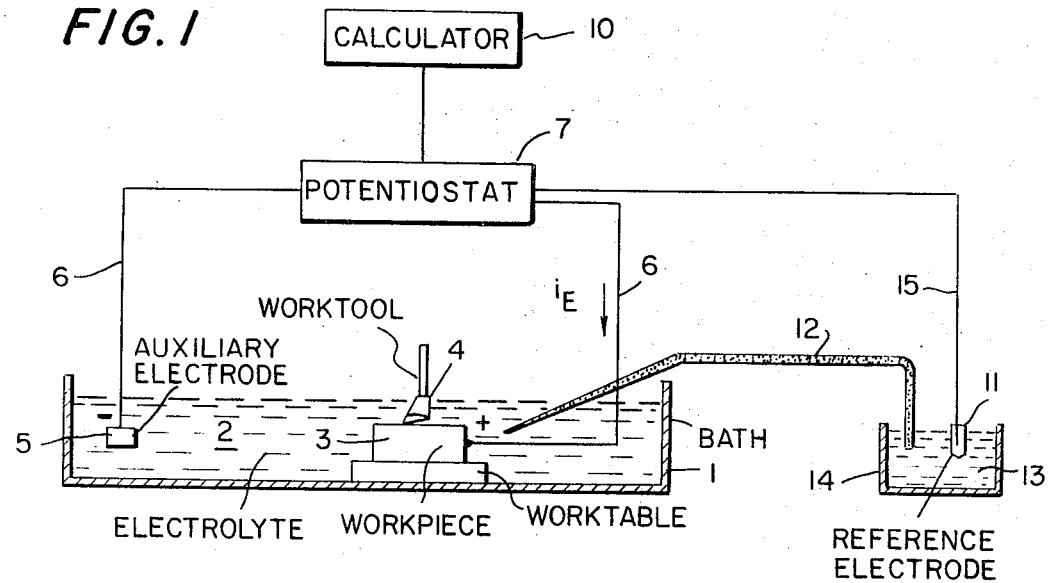
FIG. 1 is a schematic illustration of the components used in carrying out this invention.
Figure 2:
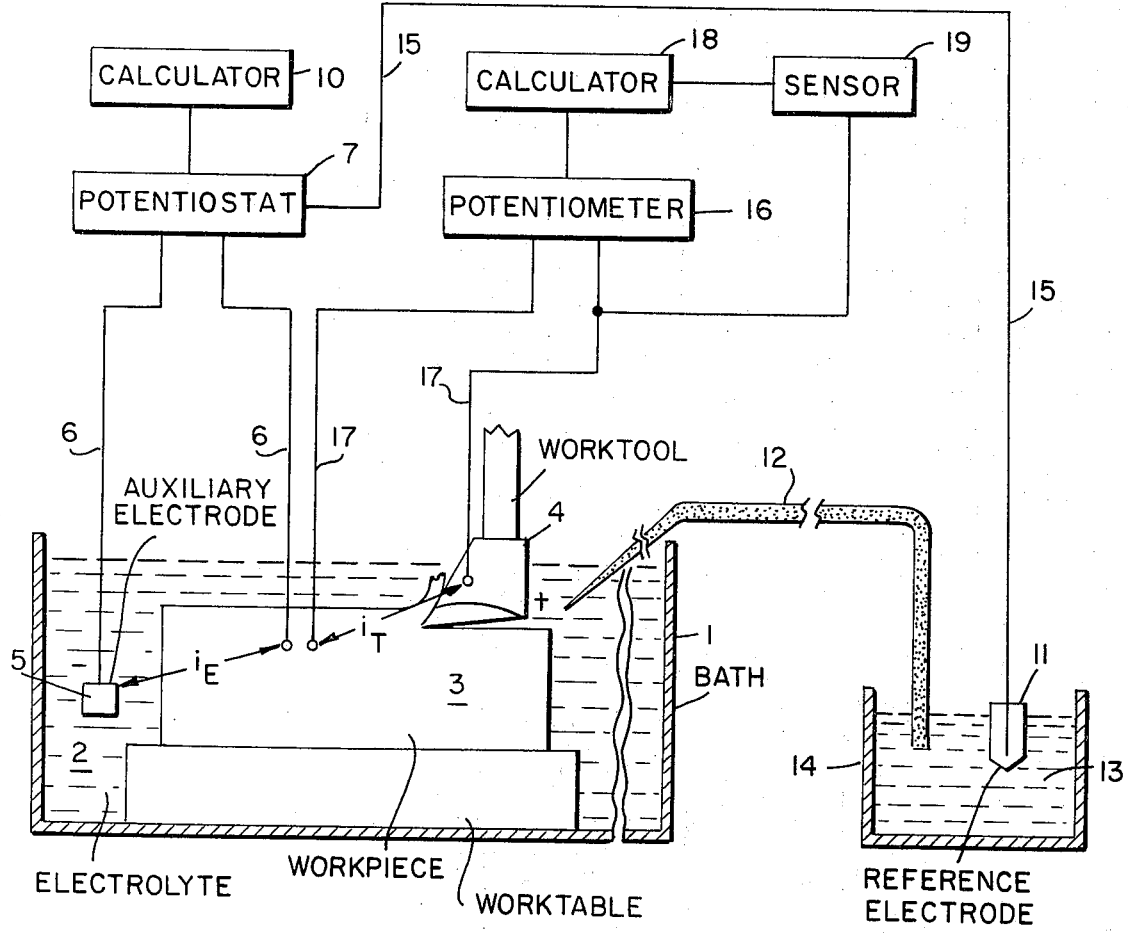
FIG. 2 is a schematic illustration of the components used in carrying out a modified form of this invention.

FIG. 1 schematically shows a generally rectangular open bath 1 which may contain an aqueous 1N sodium sulfate electrolyte 2 maintained at a temperature of 23°F. The metallic workpiece to be machined may be a polycrystalline nickel alloy and the workpiece is designated 3. The workpiece 3 may be totally immersed in the electrolyte bath 2 and may be positioned on a suitable worktable. The workpiece 3 may be machined by a carbide cutter 4 which may be moved along the surface of the workpiece 3. The cutter 4 may be moved by means of gears and a motor (both of which are not shown).

An auxiliary platinum electrode 5 may also be immersed in the electrolyte. The auxiliary electrode 5 and the workpiece 3 may be electrically connected by wires 6 to a potentiostat 7 to complete a first electrical circuit whereby a current $i_E$ may pass therethrough. A calculator 10 may be associated with the potentiostat 7.

A standard Calomel reference electrode 11 and an associated Luggin conductive bridge 12 may be provided against which a potential applied to the workpiece 3 may be compared. The reference electrode 11 and the conductive bridge 12 may be located external to the bath 1 with the reference electrode 11 immersed in a potassium chloride electrolyte 13 confined within a container 14. The standard electrode 11 may be electrically connected by means of a wire 15 to the potentiostat 7. The bridge 12 may provide electrical conductance between the electrolyte 2, confined in the bath 1, and the electrolyte 13, confined in the container 14.

The practice of the preferred embodiment of the process may be carried out by first totally immersing the nickel alloy workpiece 3 in the electrolyte 2 confined within the bath 1. The auxiliary electrode 5 may also be immersed within the electrolyte 2. An optimum electrical potential that will be suitable for the nickel alloy workpiece 3 and the cutter 4 may then be selected by the calculator 10 based upon data which may be known and may be readily available pertaining to the composition of the workpiece 3, the type of electrolyte 2, and the type of machining cutter 4 utilized. This optimum potential value thus calculated may then be fed to the potentiostat 7 and applied to the workpiece 3 relative to the reference electrode 11. The selected optimum potential may be such that a current density on the order of 1 mA/cm$^2$ may pass between the workpiece 3 and the auxiliary electrode. Simultaneously with the application of the aforementioned potential, the cutter 4 may be moved along the surface of the nickel alloy workpiece 3 and metal chips may be extracted from the workpiece 3 to produce a metal product of the desired size and shape.

In the modified form of the invention, a second electrical circuit may be arranged in the aforementioned system in order to compensate for the thermoelectric current which may arise due to the development of a thermoelectric emf in the workpiece-worktool contact zone. The second circuit may include a potentiometer 16 for supplying the necessary source of electrical potential. Additionally, the second circuit is provided with wires 17 which may electrically connect the potentiometer 16 to both the workpiece 3 and the cutter 4 both of which act as the electrodes for the second circuit. The current passing through the wires 17 may be designated $i_T$.

The optimum electrical potential that may be supplied by the potentiometer 16 may be selected by a second calculator 18 which is connected to the potentiometer 16. The potential so selected may be based upon data which may be known or may be readily available pertaining to the composition of the workpiece and the type of machining tool utilized after the magnitude and direction of current is sensed by the sensor 19. An optimum electric current that may be passed between the polycrystalline nickel alloy workpiece 3 and the carbide cutter 4 may be 80 mA. Under this condition, the thermoelectric compensation provided by the second circuit and electrochemical assistance provided by the first circuit may be used in an additive manner to yield superior metal cutting performance. Simultaneously with the application of the electrical potential to the workpiece as a result of current passing between the workpiece 3 and the auxiliary electrode 5 and the application of a current between the workpiece 3 and the cutter 4, the cutter may be moved along the surface of the workpiece 3 to produce a metal product of the desired size and shape.

Although this invention has been described with reference to certain aspects and certain embodiments, it will be apparent to those skilled-in-the-art that changes and modifications may be made thereto which fall within the scope of the claims.

I claim:

1. A method of machining a metallic workpiece with a worktool comprising passing an electrolyte in contact with a workpiece; immersing an auxiliary electrode in said electrolyte; providing a reference electrode; passing a current between said auxiliary electrode and said workpiece sufficient to maintain a predetermined potential between said workpiece and said reference electrode, thereby controlling the mechanical and physical properties of the workpiece without significantly chemically deplating metal from the workpiece; and removing metal from the workpiece principally by the frictional movement of the worktool in direct contact with the workpiece.

2. The method of claim 1, wherein the workpiece is immersed in the electrolyte.

3. The method of claim 1, wherein the reference electrode is immersed in the electrolyte.

4. The method of claim 1, wherein the reference electrode is immersed in a second electrolyte which is conductively bridged or connected to the electrolyte carrying the auxiliary electrode.

5. The method of claim 1, wherein at least 95% of the metal removed from the workpiece occurs by frictional movement of the worktool in direct contact with the workpiece.

6. The method of claim 1, wherein the electrolyte is continuously passed into contact with a surface of the workpiece.

7. The method of claim 1, wherein the workpiece is made an anode.

8. The method of claim 1, wherein the workpiece is made a cathode.

9. The method of claim 1, wherein the worktool is an electrical conductor, including the step of applying a second electrical potential between the workpiece and the worktool.

10. The method of claim 1, wherein the worktool is an electrical conductor, including the steps of sensing the thermoelectric emf and the resultant thermoelectric current present at the workpiece-worktool contact zones and applying an electrical potential between the workpiece and the worktool to compensate for or reduce said thermoelectric current.

11. The method of claim 10, wherein the current applied between the workpiece and worktool is below about 120 mA.

12. The method of claim 1, wherein the metal is removed by drilling.

13. The method of claim 1, wherein the electrolyte is a mineral acid.

14. The method of claim 13, wherein the electrolyte is selected from the group consisting of sulfuric, boric, nitric, phosphoric acid and salts of any one of said acids.

15. The method of claim 14, wherein the workpiece is a nickel alloy.

16. The method of claim 15, wherein the current passing between said auxiliary electrode and said workpiece is below about 10 mA/cm$^2$.

* * * * *